United States Patent [19]

Dolle

[11] Patent Number: 5,424,704

[45] Date of Patent: Jun. 13, 1995

[54] SOLENOID VALVE WITH A TUBULAR METALLIC CORE

[75] Inventor: Pascal Dolle, Issoire, France

[73] Assignee: Sagem Allumage, France

[21] Appl. No.: 259,861

[22] Filed: Jun. 15, 1994

[30] Foreign Application Priority Data

Jun. 16, 1993 [FR] France .................. 93 07250

[51] Int. Cl.⁶ ............................................. H01F 3/00
[52] U.S. Cl. ..................................... 335/298; 335/258;
251/129.18; 29/602.1; 29/606
[58] Field of Search ...................... 251/129.01–129.22;
335/258, 281, 298; 29/602.1, 606

[56] References Cited

FOREIGN PATENT DOCUMENTS

| 128646 | 4/1984 | European Pat. Off. . |
|---|---|---|
| 2276472 | 7/1976 | France . |
| 1272665 | 6/1968 | Germany . |
| 484497 | 12/1970 | Switzerland . |

*Primary Examiner*—Leo P. Picard
*Assistant Examiner*—Ramon M. Barrera
*Attorney, Agent, or Firm*—Rosenman & Colin

[57] ABSTRACT

A solenoid valve comprising an electromagnetic coil (6) wound on the hub of a bobbin (5) of a plastic material, a metallic central core (10) disposed in the hub (7) of the bobbin, the core forming an axial conduit, and an armature (15) which can be displaced by electromagnetic forces axially towards an end of the said axial conduit in order to control the flow of gas in the said conduit. To this end a thread (11) is formed on the outer surface of the core to cooperate with the inner surface of the hub for the purpose of adjustment of the axial position of the core with respect to the armature.

5 Claims, 1 Drawing Sheet

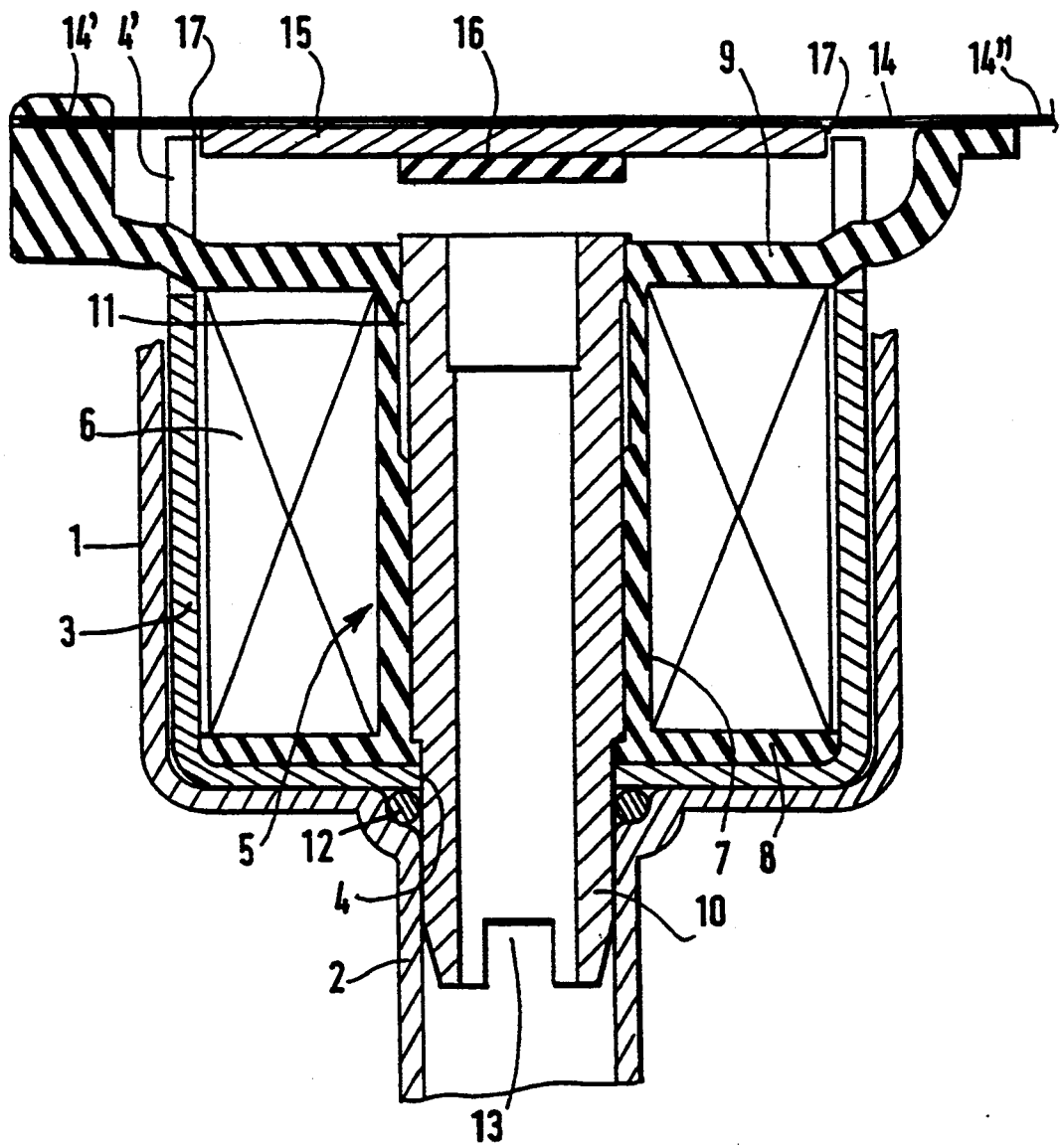

SOLENOID VALVE WITH A TUBULAR METALLIC CORE

BACKGROUND OF THE INVENTION

The present invention relates to a solenoid valve with a tubular metallic core and in particular to such a solenoid valve comprising an electromagnetic coil wound on the hub of a bobbin of a plastic material, a central metallic core disposed in the hub of the bobbin, the said core forming an axial conduit, and an armature which can be displaced by electromagnetic forces axially towards an end of the said axial conduit in order to control the flow of gas in the said conduit.

Such solenoid valves are in particular used in feed systems for the combustible mixture of internal combustion engines.

In these devices the coil is supplied with intermittent current of a cyclic ratio which can vary from 0 to 100%, so as to vary the distance between the armature, generally supporting a sealing joint, and the end of the central tubular core. The effect of this is to determine the output of the valve for a given value of differential pressure prevailing at both sides of the valve.

It is consequently understood that a critical problem with this type of solenoid valve resides in the adjustment of the distance, at rest, between the armature and the end of the axial conduit. This distance was previously determined by virtue of extremely precise machining and assembly of the different pieces of the solenoid valve. This led to high costs.

The present invention aims to overcome this difficulty by providing a solenoid valve of the aforementioned type which does not require particularly precise machining and which is quick and easy to adjust.

SUMMARY OF THE INVENTION

To this end the invention firstly has the object of providing a solenoid valve comprising an electromagnetic coil wound on the hub of a bobbin of a plastic material, a metallic central core disposed in the hub of the bobbin, the said core forming an axial conduit, and an armature which can be displaced by electromagnetic forces axially towards an end of the said axial conduit in order to control the flow of gas in the said conduit, characterised in that a thread is formed on the outer surface of the core to cooperate with the inner surface of the said hub for the purpose of adjustment of the axial position of the core with respect to the armature.

The core is preferably provided with means allowing it to be rotationally driven with respect to the bobbin from the outside of the solenoid valve.

In a preferred embodiment of the invention the bobbin is moulded onto the core.

By virtue of the invention the adjustment of the distance between the armature and the end of the axis conduit is consequently carried out by adjusting the axial position of the central core by simple screwing or unscrewing. When the plastic material of the bobbin is simply moulded onto the core and the core thus forms an insert inside the hub of the bobbin, the first initiation of rotation of the core with respect to the bobbin has the effect of breaking the connection existing between the metal and the plastic material. The continuation of the rotation causes the axial displacement of the core with respect to the bobbin, the thread of the core having the effect of threading the inside surface of the hub. As a result of this threading, the core remains firmly held in the hub of the bobbin so that when suitable adjustment has been obtained it is not necessary to otherwise fix the core.

In a particular embodiment, the solenoid valve in accordance with the invention comprises a return flux magnetic circuit in a U shape, the said armature being arranged to move between the arms of the U.

In the solenoid valves of the Prior Art, the arms of the U were splayed towards their end and the armature extended beyond these arms, progressively coming closer to them as the armature approached the core. In such an arrangement the gap between the core and the armature contributed to the electromagnetic force exerted on the armature but induced scatter from one valve to another because of the axial build-up of tolerances.

On the other hand, in the solenoid valve of the invention, because the armature is disposed between the arms of the U the only tolerances to be met are radial tolerances which are much easier to comply with. Scatter affecting performance is not otherwise encountered because it is possible to adjust precisely the central, functional and driving gap between the armature and the core.

It is also the object of the invention to create a manufacturing and adjustment procedure for a solenoid valve comprising an electromagnetic coil wound on the hub of a bobbin of plastic material, a metallic central core disposed in the hub of the bobbin, the said core forming an axial conduit, and an armature which can be displaced by electromagnetic forces axially towards an end of the said axial conduit in order to control the flow of gas in the said conduit, characterised in that it comprises steps consisting of:

- forming a thread on the outer surface of the said core;
- moulding the said bobbin onto the core so that the plastic material of the bobbin adheres to the outer surface of the core by penetrating into the said thread;
- mounting the solenoid valve;
- breaking the connection between the bobbin and the core by turning the core about its axis with respect to the bobbin;
- adjusting the axial position of the core by continuing its rotational movement.

BRIEF DESCRIPTION OF THE DRAWING

The single drawing FIGURE is a partial axial cross-section of a solenoid valve in accordance with the invention.

DESCRIPTION OF THE PREFERRED EMBODIMENT

A particular embodiment of the invention will now be described by way of non-limiting example, with reference to the single drawing which is a partial axial cross-section of a solenoid valve in accordance with the invention.

The members of this solenoid valve are disposed inside a housing 1 substantially forming a cylindrical vessel of which the base has an opening extended by an evacuation conduit 2. The underside of the vessel 1 is closed by a cover (not illustrated) mounted in any convenient manner and provided with an inlet conduit for gas.

A piece 3 is placed inside the vessel 1. This piece 3 is formed of a plate of magnetic material curved into a U shape of which the central part is pierced by a hole 4 and of which the end of each arm comprises a slot 4'.

Inside the piece 3 a bobbin 5 of a plastic material is disposed on which a coil 6 is wound. This bobbin 5 is formed of a hub 7 and two end flanges 8 and 9.

A tubular conduit 10 of magnetic material is disposed coaxially to the inside of the hub 7. It is provided with a thread 11. The bobbin 5 is moulded onto the conduit 10 so that the plastic material of this bobbin penetrates into the threads of the threaded part 11.

The tubular conduit passes through the hole 4 formed in the central part of the armature 3 and enters into the evacuation conduit 2. A joint 12 ensures the seal between the outside of the conduit 10 and the inside of the conduit 2.

The end of the conduit 10 engaged in the conduit 2 comprises the slots 13 permitting the conduit 10 to be pivoted about its axis with the aid of a tool engaged in the conduit 2.

An elastic metallic leaf 14 is mounted above the assembly, which will be described with one of its ends 14' fixed with respect to this assembly and one end 14" able to slide parallel to itself in order to allow the leaf 14 to bend.

This leaf 14 carries on its side facing the end of the conduit 10, which is opposite that which carries the slots 13, an armature 15 likewise of a magnetic material and having a sealing joint 16 facing the opening of the conduit 10.

When at rest the leaf 14 is straight and extends substantially perpendicular to the axis of the conduit 10 and, during operation when it is bent towards the core 10, the armature moves between the arms of the piece 3 perpendicularly to these arms forming two very narrow gaps 17.

The assembly of this solenoid valve is carried out in the following manner.

The bobbin 5 is firstly moulded onto the tubular conduit 10, the coil 6 is then wound onto this bobbin. The piece 3 and the coil thus formed are then introduced into the vessel 1 with the interposing of the joint 12. The leaf 14 carrying the armature 15 and the joint 16 are finally positioned and the valve cover is closed.

The adjustment is carried out by introducing a tool into the conduit 2 so as to turn the conduit 10. This turning firstly causes a break in the connection between the plastic material of the bobbin 5 and the metal of the conduit 10 then a displacement of the latter upwards towards the armature 15. When a suitable adjustment has been achieved, which can be determined by any convenient means, the distance between the end opening of the conduit and the armature 15 has the desired value and the tool is withdrawn.

No other operation is necessary to adjust this solenoid valve.

I claim:

1. A solenoid valve comprising an electromagnetic coil (6) wound on the hub of a bobbin (5) of a plastic material, a central metallic core (10) disposed in the hub (7) of the bobbin, the said core forming an axial conduit, and an armature (15) which can be displaced by electromagnetic forces axially towards an end of the said axial conduit in order to control the flow of gas in the said conduit, characterised in that a thread (11) is formed on the outer surface of the core to cooperate with the inner surface of the said hub for the purpose of adjustment of the axial position of the core with respect to the armature.

2. A solenoid valve according to claim 1, in which the core is provided with means (13) permitting it to be rotatably driven with respect to the bobbin from the outside of the solenoid valve.

3. A solenoid valve according to claim 1, in which the bobbin is moulded onto the core.

4. A solenoid valve according to claim 1, comprising a return flux magnetic circuit (3) in a U shape, the said armature being arranged to move between the arms of the U.

5. A manufacturing and adjusting process for a solenoid valve comprising an electromagnetic coil wound on the hub of the bobbin of plastic material, a metallic central core disposed in the hub of the bobbin, the said core forming an axial conduit, and an armature which can be displaced by electromagnetic forces axially towards an end of the said axial conduit in order to control the flow of gas in the said conduit, characterised in that it comprises steps consisting of:

forming a thread on the outer surface of the said core;

moulding the said bobbin onto the core so that the plastic material of the bobbin adheres to the outer surface of the core by penetrating into the said thread;

mounting the solenoid valve;

breaking the connection between the bobbin and the core by turning the core about its axis with respect to the bobbin;

adjusting the axial position of the core by continuing its rotational movement.

* * * * *